US012792246B2

(12) United States Patent
Sankaranarayanan

(10) Patent No.: US 12,792,246 B2
(45) Date of Patent: Nov. 10, 2026

(54) SUPERBLOCK COMPRISING BLOCKS DETERMINED BASED ON PIECEWISE SLOPES

(71) Applicant: Micron Technology, Inc., Boise, ID (US)

(72) Inventor: Sundararajan Sankaranarayanan, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/243,383

(22) Filed: Jun. 19, 2025

(65) Prior Publication Data

US 2025/0390242 A1 Dec. 25, 2025

Related U.S. Application Data

(60) Provisional application No. 63/661,706, filed on Jun. 19, 2024.

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
CPC ...... G06F 3/064; G06F 3/0604; G06F 3/0679; G06F 3/0688
See application file for complete search history.

(56) References Cited

U.S. PATENT DOCUMENTS

| | | | | |
|---|---|---|---|---|
| 11,132,145 | B2 | 9/2021 | Liu et al. | |
| 2011/0040925 | A1 | 2/2011 | Frost et al. | |
| 2019/0096507 | A1 | 3/2019 | Gaewsky et al. | |
| 2020/0125294 | A1 | 4/2020 | Parker | |
| 2021/0011842 | A1 | 1/2021 | Lee | |
| 2022/0342544 | A1* | 10/2022 | Cariello | G06F 3/064 |
| 2023/0229326 | A1* | 7/2023 | Buxton | G06F 11/108 711/154 |

FOREIGN PATENT DOCUMENTS

WO 2025264917 12/2025

OTHER PUBLICATIONS

"International Application Serial No. PCT US2025 034362, International Search Report mailed Oct. 23, 2025", 3 pages.
"International Application Serial No. PCT US2025 034362, Written Opinion mailed Oct. 23, 2025", 3 pages.

* cited by examiner

*Primary Examiner* — Zhuo H Li
(74) *Attorney, Agent, or Firm* — Schwegman Lundberg & Woessner, P.A.

(57) ABSTRACT

Various embodiments provide for a superblock comprising blocks of a memory device (e.g., NAND-type memory device) that are determined (e.g., selected) based on piecewise slopes, which can be used as part of a memory system (e.g., memory sub-system). According to some embodiments, an individual superblock of a memory device is formed or structured using individual blocks selected, from across multiple planes of a memory die, based on a plurality of different linear slopes.

20 Claims, 6 Drawing Sheets

SUPERBLOCK COMPRISING BLOCKS DETERMINED BASED ON PIECEWISE SLOPES

PRIORITY APPLICATION

This application claims the benefit of priority to U.S. Provisional Application Ser. No. 63/661,706, filed Jun. 19, 2024, which is incorporated herein by reference in its entirety.

TECHNICAL FIELD

Example embodiments of the disclosure relate generally to memory devices and, more specifically, to a superblock comprising blocks of a memory device that are determined based on piecewise slopes, which can be used as part of a memory system (e.g., memory sub-system).

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
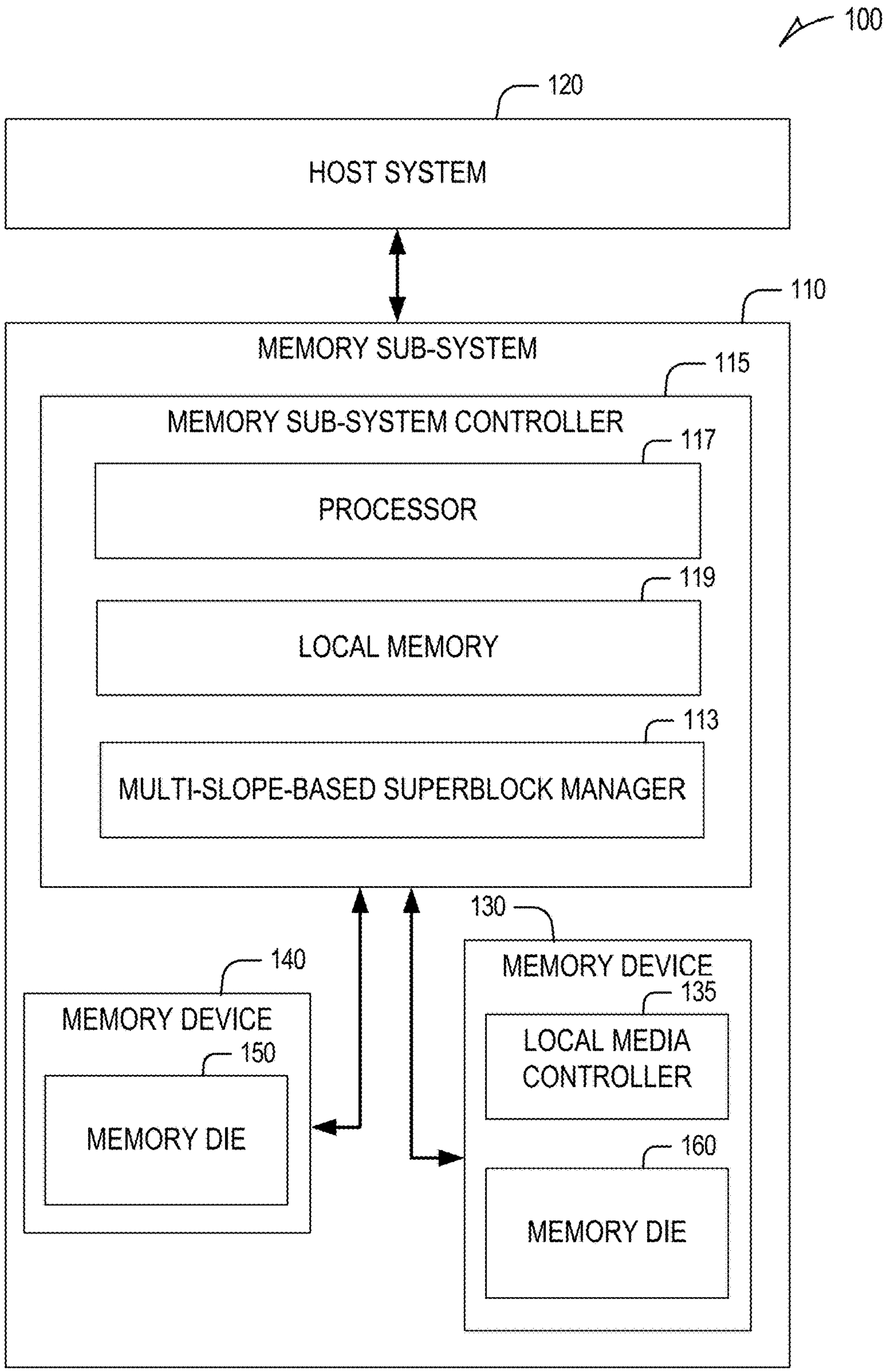
FIG. 1 is a block diagram illustrating an example computing system that includes a memory sub-system, in accordance with some embodiments of the present disclosure.

Aspects of the present disclosure are directed to a superblock comprising (e.g., formed by) blocks of a memory device that are determined (e.g., selected) based on piecewise slopes, which can be used as part of a memory system (e.g., memory sub-system). A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write commands, read commands) to the memory sub-system, such as to store data on a memory device at the memory sub-system, read data from the memory device on the memory sub-system, or write/read constructs with respect to a memory device on the memory sub-system. The data to be read or written, as specified by a host request (e.g., data access request or command request), is hereinafter referred to as “host data.” A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation on host data that is stored on a memory device or a scan (e.g., media scan) of one or more blocks of a memory device. For example, firmware of the memory sub-system can re-write previously written host data from a location of a memory device to a new location as part of garbage collection management operations. The data that is re-written, for example as initiated by the firmware, is hereinafter referred to as “garbage collection data.”

“User data” hereinafter generally refers to host data and garbage collection data. “System data” hereinafter refers to data that is created and/or maintained by the memory sub-system for performing operations in response to host requests and for media management. Examples of system data include, and are not limited to, system tables (e.g., logical-to-physical memory address mapping table (also referred to herein as an L2P table), data from logging, scratch pad data, and so forth).

A memory device can be a non-volatile memory device. A non-volatile memory device is a package of one or more die. Each die (e.g., NAND-type memory device die) can comprise one or more physical planes (or planes). Groupings of planes can be organized according to logic units (LUNs), with each individual logic unit (LUN) being associated with a different grouping of planes. For some types of non-volatile memory devices (e.g., NOT-AND (NAND)-type devices), each plane comprises a set of physical blocks. For some memory devices, blocks are the smallest area that can be erased. Each block comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

Generally, writing data to such memory devices involves programming (by way of a program operation) the memory devices at the page level of a block, and erasing data from such memory devices involves erasing the memory devices at the block level (e.g., page level erasure of data is not possible). Certain memory devices, such as NAND-type memory devices, comprise one or more blocks, (e.g., multiple blocks) with each of those blocks comprising multiple pages, where each page comprises a subset of memory cells of the block, and where a single wordline of a block (which connects a group of memory cells of the block together) defines one or more pages of a block (depending on the type of memory cell). Depending on the embodiment, different blocks can comprise different types of memory cells. For instance, a block (a single-level cell (SLC) block) can comprise multiple SLCs, a block (a multi-level cell (MLC) block) can comprise multiple MLCs, a block (a triple-level cell (TLC) block) can comprise multiple TLCs, a block (a quad-level cell (QLC) block) can comprise QLCs, and a block (a penta-level cell (PLC) block) can comprise PLCs. Other blocks comprising other types of memory cells (e.g., higher-level memory cells, having higher bit storage-per-cell) are also possible.

Each worldline (of a block) can define one or more pages depending on the type of memory cells (of the block) connected to the wordline. For example, for an SLC block, a single wordline can define a single page. For a MLC block, a single wordline can define two pages-a lower page (LP) and an upper page (UP). For a TLC block, a single wordline can define three pages-a lower page (LP), an upper page (UP), and an extra page (XP). For a QLC block, a single wordline can define four pages-a lower page (LP), an upper page (UP), an extra page (XP), and a top page (TP) page. As used herein, a page of LP page type can be referred to as a "LP page," a page of UP page type can be referred to as a "UP page," a page of XP page type can be referred to as a "XP page," and a page of TP page type can be referred to as a "TP page." Each page type can represent a different level of a cell (e.g., QLC can have a first level for LPs, a second level for UPs, a third level for XPs, and a fourth level for TPs). To write data to a given page, a wordline associated with the given page is programmed according to a page programming algorithm (e.g., that causes one or more voltage pulses or pulses to memory cells of a block based on the memory). Generally, programming a single wordline of a block results all the pages in the single wordline being programmed, where the number pages being programmed depends on the type of block. For example, programming a single wordline of a QLC block usually results in four pages (e.g., LP, UP, XP, TP pages) associated with the single wordline being programmed.

Although NAND-type memory devices permit write and read addressing at a page level and erasure addressing at a block level, there are some practical difficulties in such fine-grained resolution. These difficulties can include addressing overhead for a variety of tasks and operations, including maintenance of one or more tables that enable a flash translate layer (FTL) comprising a hardware/software layer in a controller of a memory sub-system that manages one or more operations on the memory sub-system. The FTL can, for example, perform logical-to-physical address translation, garbage collection, wear-leveling, error correction code (ECC), and bad block management.

To address these issues, blocks have been aggregated into a single logical entity or unit to which data is written, where each single logical entity/unit can be referred to as a logical superblock (hereafter, superblock). This arrangement provides some benefits, such as parallel execution of a write command across one or more memory circuit die (or memory die) or mitigating the impact of bad blocks on overall device performance. Superblocks can enable tracking fewer storage units, relieving pressure on FTL tables and management. This can be important in resource-limited memory sub-systems, where available working memory (e.g., random access memory (RAM) holding system state) can be limited. Using superblocks as a basic operational unit in the memory device can provide efficient resource management, while permitting more efficient maintenance operations (e.g., reduced latency and time to perform the operations) and effective device operation.

As used herein, a superblock comprises a plurality of blocks (e.g., stripe of blocks) across a plurality of planes of one or more memory die. Each individual block of a superblock of a memory die can be associated with an index value (e.g., intra-die index value) that indicates a logical or physical position of the individual block within the individual block's respective plane of the memory die. Often, a superblock is formed by blocks in a same position across multiple planes (e.g., a same logical or physical position on each plane of multiple planes) of a single memory circuit die (or single memory die) or of multiple memory die (e.g., that form a memory array). An individual superblock often includes a single block from each of multiple planes of one or more memory die. A single superblock of a memory die is said to have (e.g., to be formed by) a vertical linear slope spanning multiple planes of the memory die when the single superblock comprises a single block from each of the multiple planes, and each of the single blocks has the same position (e.g., has the same intra-die index value) on the single block's respective plane. For instance, superblock 2 of a memory die can comprise block 2 (e.g., the block having an intra-die index value of 2) from each of multiple planes of the memory die.

A superblock can also be formed by blocks (e.g., stripe of blocks) positioned across (e.g., logically or physically positioned on each plane of) multiple planes of a memory die (or a memory circuit die) according to a linear slope, where the non-horizontal linear slope can be determined based on one or more characteristics of the memory die. For various embodiments, a linear slope can be a non-horizontal liner slope, which is greater than or less than 0. Depending on the implementation, the linear slope can have a positive slope or a negative slope. Superblocks formed across a plurality of planes of a memory die based on (e.g., according to) a non-horizontal linear slope results in each individual superblock comprising (e.g., being formed by) a single block from each plane (of the plurality of planes) having a position (e.g., an intra-die index value) in the single block's respective plane that is different than the other blocks in the individual superblock. In particular, a superblock formed based on a non-horizontal linear slope can comprise a series of individual blocks, each from different planes, where consecutive blocks in the series that have an intra-plane position (e.g., corresponding to an intra-die index value) that is skewed with respect to each other. A characteristic used to determine the linear slope includes, for example, a characteristic that facilitates the formation of superblocks where bad blocks are distributed uniformly across different superblocks. A linear slope determined on such a characteristic can prevent more than a certain number of bad blocks (of different planes) from lining up to form a single superblock (e.g., form a stripe of the single superblock). Generally, the more bad blocks within a single superblock, the poorer the write performance for the single superblock. When the use of a memory device initially begins, one or more characteristics of memory die (e.g., distribution of bad blocks at memory die level, or some other metric) can be analyzed, a non-horizontal linear slope can be determined based on one or more analyzed characteristics, and a superblock structure for the memory device can be set (e.g., established) based on the determined non-horizontal linear slope.

Current technologies form an individual superblock using individual blocks selected, from across multiple planes of a memory die, based on a single linear slope. This can be referred to as single-slope superblock formation. While this strategy provides a single distribution slope across memory dies to create an individual superblock (e.g., aiming to maintain write-performance consistency and distribution of bad blocks), the industry continuously seeks to optimize the process of determining superblock structures to enhance the reliability and efficiency of NAND-base memory devices.

Various embodiments presented herein can improve of conventional methodologies for forming/structuring superblocks. In particular, various embodiments presented herein provide for a superblock comprising blocks of a memory device (e.g., NAND-type memory device) that are determined (e.g., selected) based on piecewise slopes, which can be used as part of a memory system (e.g., memory sub-system). According to some embodiments, an individual superblock of a memory device is formed or structured using individual blocks selected, from across multiple planes of a memory die, based on a plurality of different linear slopes. Various embodiments described herein use a plurality of linear slopes to implement a piecewise linear skewing approach with respect to forming/structuring individual superblocks on a memory device. Where a single superblock is determined (e.g., formed or structured) based on a plurality of linear slopes, each linear slope of the plurality can be referred to herein as a different piecewise slope. An embodiment can be implemented by way of a processing device (e.g., memory sub-system controller) of a memory system (e.g., a memory sub-system), which can form/structure multiple superblocks across a memory device of the memory system using multiple linear slopes. The use of various embodiments can enhance the uniformity of bad block distribution across a stripe that forms an individual superblock, thereby improving memory device (e.g., NAND-type memory device) performance consistency. The piecewise linear skewing technique of some embodiments provides flexibility in superblock construction, which can facilitate more efficient and reliable data management and increased memory device lifespan.

Disclosed herein are some examples of one or more superblocks that are determined (e.g., formed or structured) based on piecewise slopes, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include a NAND-type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND-type flash memory includes, for example, two-dimensional (2D) NAND and 3D NAND.

Each of the memory devices 130 can include one or more arrays of memory cells. One type of memory cell, for example, SLCs, can store one bit per cell. Other types of memory cells, such as MLCs, TLCs, QLCs, and penta-level cells (PLCs), can store multiple or fractional bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as an MLC block, a block comprising TLCs can be referred to as a TLC block, and a block comprising QLCs can be referred to as a QLC block.

Although non-volatile memory components such as NAND-type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or another suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands, requests, or operations from the host system 120 and can convert the commands, requests, or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

Each of the memory devices 130, 140 include a memory die 150, 160. For some embodiments, each of the memory devices 130, 140 represents a memory device that comprises a printed circuit board, upon which its respective memory die 150, 160 is solder mounted.

The memory sub-system controller 115 can implement a flash translation layer (FTL) using superblocks. The memory sub-system controller 115 includes a multi-slope-based superblock manager 113 that enables or facilitates the memory sub-system controller 115 to support individual superblocks formed or constructed based on a plurality of non-horizontal linear slopes (e.g., piecewise slopes). For some embodiments, an individual superblock is determined (e.g., formed or structured) based on a plurality of linear slopes such that the individual superblock comprises a plurality of blocks in different (e.g., skewed) positions (e.g., logical or physical positions) across multiple planes of one or more memory die (e.g., 150, 160) of a single memory device (e.g., 130, 140), such as across all memory die of a single memory device. A first superblock of an embodiment can comprise a series (e.g., stripe) of blocks from multiple planes of a memory die (e.g., 150, 160), where a first sub-series of blocks (of the series) comprises blocks selected from a first plurality of planes of a memory die (e.g., 150, 160) based on a first non-horizontal linear slope of a plurality of non-horizontal linear slopes, and a second sub-series of blocks (of the series) comprises blocks selected from a second plurality of planes of a memory die (e.g., 150, 160) based on a second non-horizontal linear slope of a plurality of non-horizontal linear slopes, where the second sub-series follows the first sub-series within the series, and where the first and the second non-horizontal linear slopes are different. In this example, the first sub-series can represent a first piece (e.g., sub-stripe) of the individual superblock, and the second sub-series can represent a second piece (e.g., sub-stripe) of the individual superblock, where positioning (e.g., intra-plane positioning) of blocks within a single piece (e.g., sub-stripe) of the individual superblock are skewed with respect to each other. In this way, each piece (e.g., sub-stripe) of a single superblock is formed by a different piecewise slope, and when these pieces (e.g., sub-stripes) are connected together (e.g., according to determined piece-to-piece connections or mappings), a full stripe of the single superblock is formed. Where a full stripe of the first superblock starts at a first block of a first plane of the memory die (e.g., 150, 160), a full stripe of a second superblock that can be determined (e.g., formed or structured) based on the same plurality of linear slopes, but start from a second block of the first plane and comprise different blocks (from the same planes of the memory die) than the first superblock.

Figure 2:
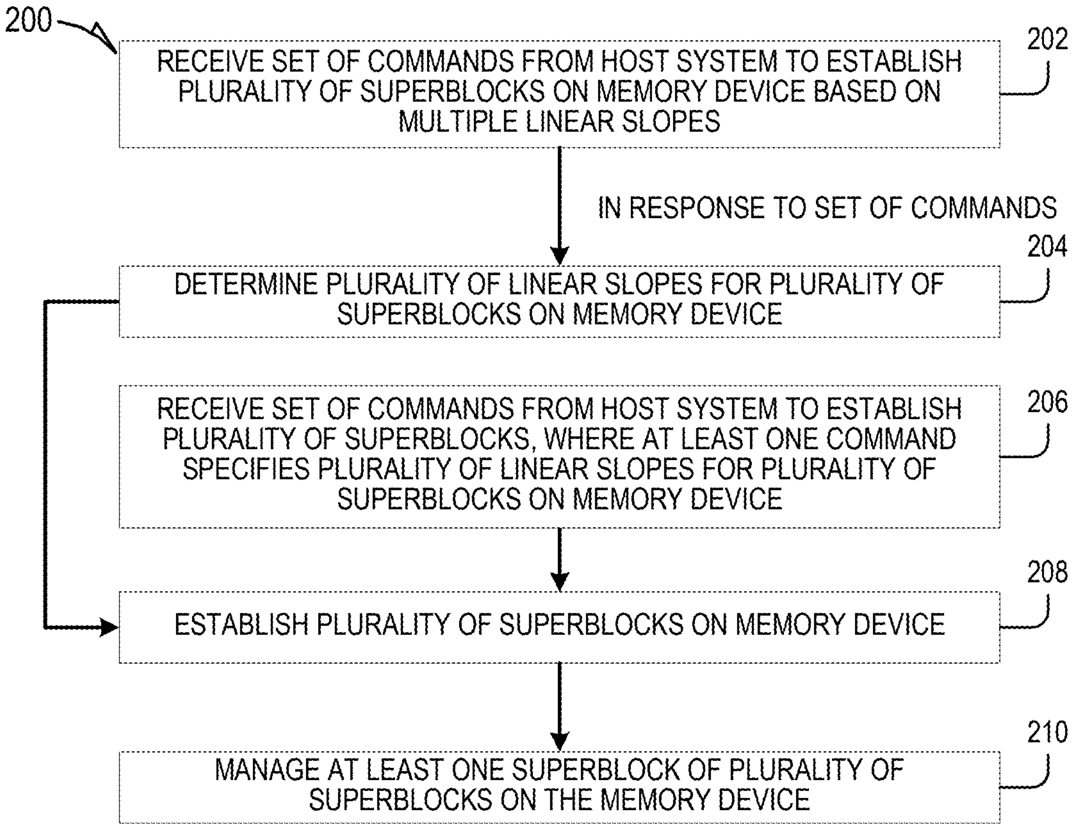
FIG. 2 illustrates a flow diagram of an example method for a superblock comprising blocks of a memory device that are determined based on piecewise slopes, in accordance with some embodiments of the present disclosure.

FIG. 2 illustrates a flow diagram of an example method 200 for a superblock comprising blocks of a memory device that are determined based on piecewise slopes, in accordance with some embodiments of the present disclosure. Any of method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 200 is performed by the memory sub-system controller 115 of FIG. 1 based on the multi-slope-based superblock manager 113. Additionally, or alternatively, for some embodiments, method 200 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible. According to some embodiments, method 200 is performed on a memory device (or a memory system), by a memory manufacturer, prior to the memory device (or the memory system) being shipped for customer/end user use.

Referring now to method 200 of FIG. 2, at operation 202, a processing device (e.g., the processor 117 of a memory sub-system controller 115) receives, from a host system (e.g., 120) a set of commands to establish a plurality of superblocks on a memory device (e.g., 130) based on multiple linear slopes. In response, at operation 204, the processing device (e.g., the processor 117) determines a plurality of linear slopes for the plurality of superblocks on the memory device (e.g., 130). Operation 204 can be performed as part of an overall process for determining a structure for the plurality of superblocks. For some embodiments, operation 204 comprises the processor analyzing a set of characteristics of one or more memory circuit die (e.g., 150) of the memory device (e.g., 130). After operation 204, method 200 proceeds to operation 208. The set of characteristics can comprise, for example, a characteristic describing a distribution of bad blocks for a select linear slope, a characteristic describing a distribution of bad blocks for the at least one memory circuit die, or both.

According to some embodiments, operation 204 uses an algorithm (e.g., search algorithm) to determine a structure for the plurality of superblocks. In particular, the algorithm can search through (e.g., evaluate) a number of different permutations for a piecewise slope-based superblock structure for a given plurality of planes of a given set of memory circuit die of a memory device. For example, with respect to a given plurality of superblocks, the algorithm can be used to determine one or more of the following: how many planes of a set of memory circuit die will form an individual plurality of planes (e.g., an individual group of planes) within each individual superblock; which planes will be in which pluralities of planes (e.g., which groups of planes); individual linear slopes for each plurality of planes (e.g., each group of planes); and connections (e.g., joints or mappings) between those pluralities (e.g., groups) of planes. Where the set of memory die comprises 32 dies with 4 planes on each die, the number of planes per an individual slope can be set to any value between 1 and 64 planes. To operate, the algorithm can receive (e.g., via the set of commands received at operation 202) one or more of the following as parameters: a number of slopes to be considered; a number of joints to be considered; an upper limit to the number of structure permutations to consider; and a lower limit to the number of structure permutations to consider. During execution, the algorithm can first determine an individual linear slope for each individual plurality (e.g., group) of planes (e.g., based on analysis of the individual plurality of planes). After each individual plurality of planes has an individual slope, the algorithm can randomly select and evaluate connections (e.g., joints or mappings) between individual pluralities (e.g., groups) of plane. For example, assuming there was 4 pluralities (e.g., groups) of planes (e.g., group A, B, C, D) for the superblock structure, then the algorithm can consider 4! different connection mappings (e.g., A-B-C-D, A-C-B-D, A-D-B-C, etc.) for joining the 4 pluralities of planes. The algorithm can be particularly useful for determining a superblock structure to be formed using three or more pluralities (e.g., groups) of planes of a set of memory circuit die. Eventually, the algorithm can select (from multiple different permutations evaluated) an individual permutation based on one or more characteristics of a superblock structure that results from the individual permutation. For instance, the algorithm can select the individual permutation in response to the individual permutation resulting in a superblock structure with the best bad block distribution (in comparison to all the other permutations evaluated by the algorithm).

Alternatively, at operation 206, the processing device (e.g., the processor 117) receives, from the host system (e.g., 120) a set of commands to establish a plurality of superblocks on a memory device (e.g., 130), where at least one command of the set of commands specifies the plurality of linear slopes. The set of commands can also specify (e.g., identify) the association of different liner slopes to different pluralities of planes, and can specify connections (e.g., joints or mappings) between the different pluralities of planes.

With respect to operation 206, the host system determines the plurality of linear slopes, the association of different liner slopes to different pluralities of planes, and can specify connections between the different pluralities of planes. The host system can determine the plurality of linear slopes (and related information) by analyzing a set of characteristics of one or more memory circuit die of the memory device (e.g., 130), or by causing the processing device (e.g., the processor 117) to perform the analysis and provide the set of characteristics to the host system. The host system (e.g., 120) can determine at least some of this information by performing the algorithm (e.g., search algorithm) described herein for searching through a number of different permutations for a superblock structure for a given plurality of planes of a given set of memory circuit die of a memory device. In such cases, the host system (e.g., 120) can provide the memory system (e.g., 110) with information regarding the structure of the plurality of superblocks (e.g., information needed to establish the plurality of superblocks on the memory system, such as linear slopes, connections, plane groupings, etc.). At least some of that information can be provided to the memory system via the set of commands. From operation 206, method 200 proceeds to operation 208.

In accordance with some embodiments, the algorithm can implement a plane group randomization approach, which can achieve better optimization results for superblock formation. For instance, the algorithm can define a granularity for each plane group (e.g., plane group A (PG-A), plane group B (PG-B), and plane group C (PG-C) with two joints) by determining how many planes are grouped to form each individual plane group. The algorithm can then optimize the slope of each plane group (e.g., PG-A, PG-B, and PG-C) independently. For all possible randomization choices of the plane groups (e.g., 3! permutations for three plane groups), the algorithm can optimize the permutation of connections (e.g., Ax-By-Cz connections) that minimize standard deviation of bad block distribution across superblocks. The algorithm can evaluate all possible randomizations and declare the permutation with the best characteristics (e.g., most uniform bad block distribution) as the winner.

During operation 208, the processing device (e.g., the processor 117) establishes (e.g., forms or structures) the plurality of superblocks on the memory device (e.g., 130) based on the plurality of linear slopes. For some embodiments, each individual superblock of the plurality of superblocks comprises at least a first plurality (e.g., group) of blocks and a second (e.g., group) plurality of blocks, where the first plurality of blocks comprises a single block from each plane of a first plurality of planes (e.g., a first plane group) of a memory circuit die (e.g., 160) of the memory device (e.g., 130), and where the second plurality of blocks comprises a single block from each plane of a second plurality of planes (e.g., a second plane group) of the at least one memory circuit die (e.g., 160) of the memory device (e.g., 130). According to some embodiments, each block of the first plurality of blocks has a first intra-plane position that is determined based on a first linear slope (of the plurality of linear slopes) that spans across the first plurality of planes, and each block of the second plurality of blocks has a second intra-plane position that is determined based on a second linear slope (of the plurality of linear slopes) that spans across the second plurality of planes. The first plurality of blocks and the second plurality of blocks can form at least part of a full stripe of an individual block such that the second plurality of blocks follows the first plurality of blocks within the full stripe (e.g., a first block of the second plurality of blocks follows a last block of the first plurality of blocks).

Though various embodiments are described herein with respect to two pluralities (e.g., two groups) of planes forming individual superblocks, individual superblocks can be formed by one or more additional pluralities of blocks (e.g., a third plurality of blocks associated with a third linear slope) in a manner similar to the first and second pluralities of blocks. Further, the different pluralities of planes (and their respective linear slopes) that form an individual superblock can all be within a single memory circuit die of the memory device, or can span across two or more different memory circuit die. For instance, the first and the second pluralities of planes can be on two separate memory circuit die of the memory device (e.g., 130).

While the foregoing examples illustrate superblocks formed using two or three linear slopes, the piecewise linear skewing approach described herein can be generalized to any number n of linear slopes to create a piecewise slope of a superblock, where n is an integer greater than or equal to two. For example, each individual superblock can comprise n pluralities of blocks, where each plurality of blocks corresponds to a different linear slope of the n linear slopes. An individual superblock can comprise a first plurality of blocks determined based on a first linear slope, a second plurality of blocks determined based on a second linear slope, and so on, where nth plurality of blocks determined based on an nth linear slope. The use of n linear slopes can provide enhanced flexibility in superblock construction and can further optimize bad block distribution across the superblock stripe by allowing finer granularity in the piecewise linear skewing approach.

To establish the plurality of superblocks, the processor can define, for the individual superblock, individual connections (e.g., joint) between multiple pluralities of blocks (e.g., groups of planes) to form a series of pluralities of blocks, where the series of pluralities of blocks form the individual superblock. For instance, the processor can define an individual connection between the first plurality of blocks and the second plurality of blocks. Where the individual superblock is formed by a first, a second, and a third plurality of blocks, the processor can define a first individual connection between the first plurality of blocks and the second plurality of blocks, and a second individual connection between the second plurality of blocks and the third plurality of blocks. According to some embodiments, data regarding connections (e.g., between pluralities or pieces of a superblock), individual slopes, pluralities of planes (e.g., plane groups), and associations relating thereto are stored on the memory system (e.g., 110) as part of establishing the plurality of superblocks on the memory device (e.g., 130).

Each linear slope of the plurality of linear slopes can span a different plurality of planes of the at least one memory circuit die (e.g., 150) of the memory device (e.g., 130). Each linear slope of the plurality of linear slopes is determined (e.g., optimized) for its corresponding plurality (e.g., group) of blocks of the individual superblock. For instance, the first linear slope (of the plurality of linear slope) can be optimized for the first plurality of blocks, and the second linear slope (of the plurality of linear slope) can be optimized for the second plurality of blocks. Each linear slope of the plurality of linear slopes can represent a different piecewise slope that forms a different piece (e.g., sub-stripe) of the individual superblock with respect to a plurality (e.g., group) of planes, thereby achieving piecewise skewing of positions of blocks within the individual superblock across multiple planes of the memory die (e.g., 130). For some embodiments, the plurality of linear slopes comprises two or more non-horizontal linear slopes, or one or more non-horizontal linear slopes and at least one horizontal linear slope (e.g., slope equal to 0). While consecutive linear slopes of the plurality of linear slopes are different (e.g., the first linear slope and the second linear slope are different), two or more non-consecutive slopes can be the same (e.g., the first linear slope and the third linear slope can be the same).

After operation 208, method 200 proceeds to operation 210, where the processing device (e.g., the processor 117) manages at least one superblock of the plurality of superblocks on the memory device. For some embodiments, managing the at least one superblock comprises writing data to the at least one superblock, reading data from the at least one superblock, or both.

Figure 3:
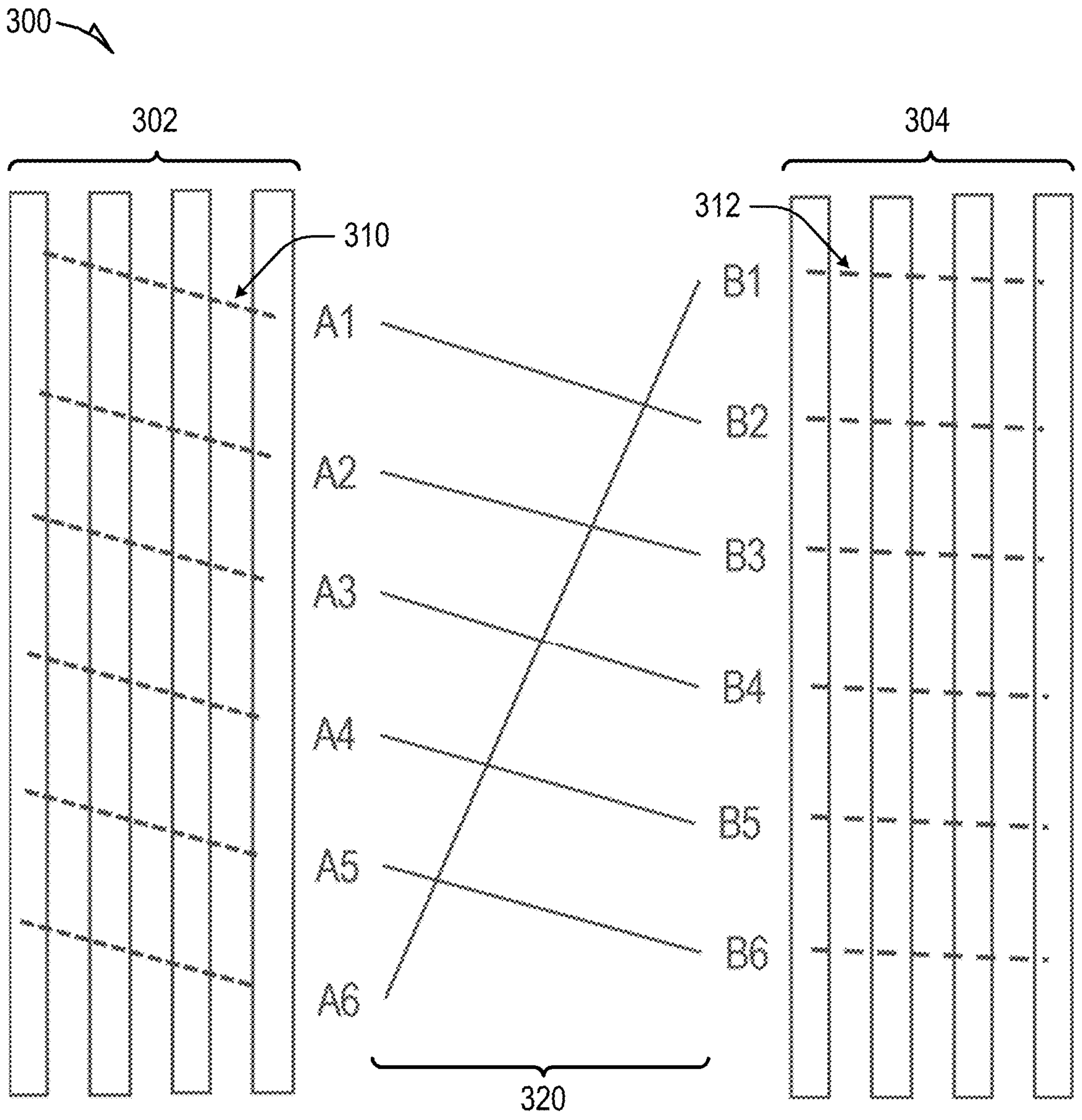
FIGS. 3 through 5 are block diagrams illustrating example superblocks that each comprise blocks of a memory device that are determined (e.g., selected) based on piecewise slopes, in accordance with some embodiments of the present disclosure.
Figure 4:
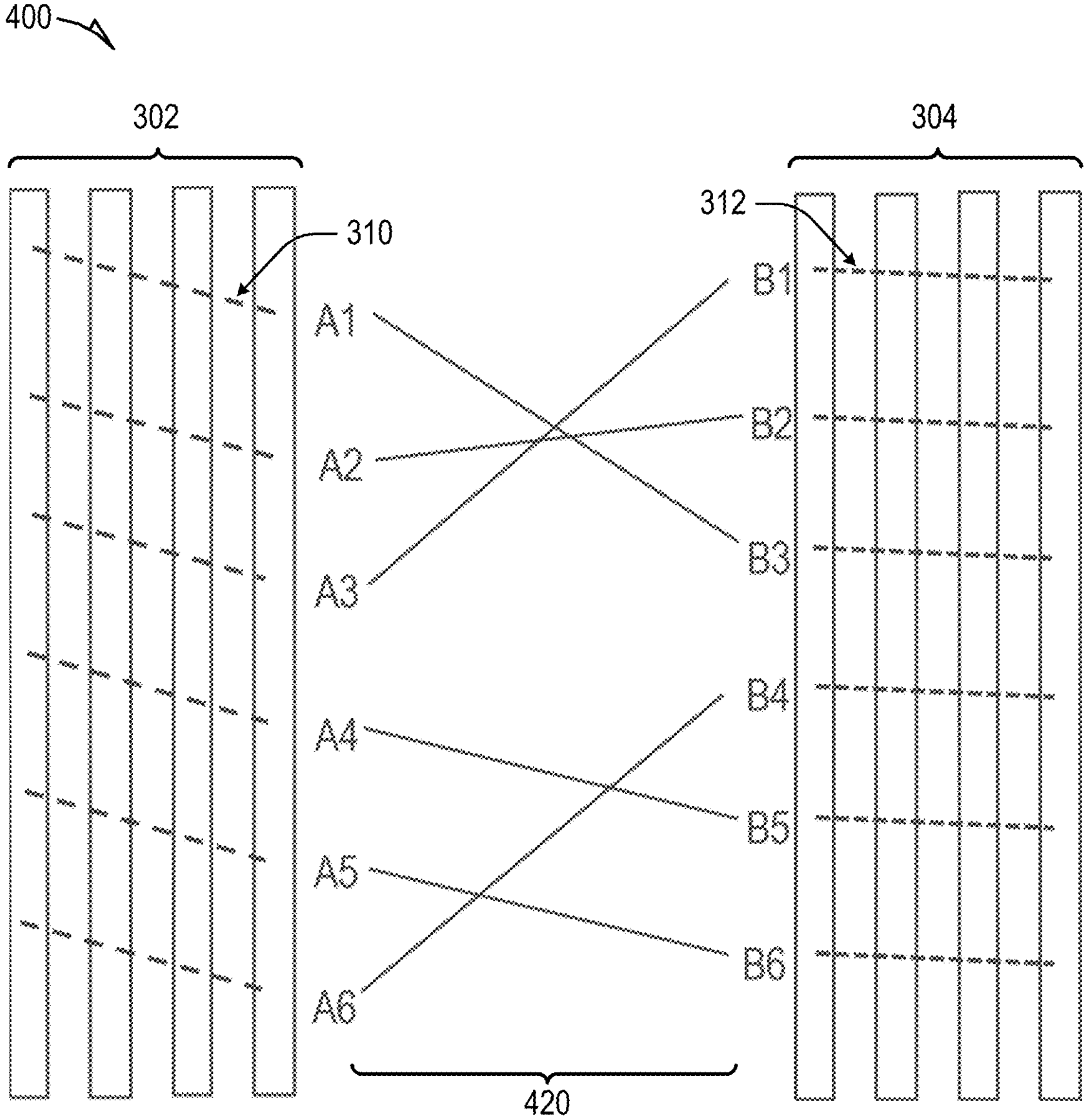
Figure 5:
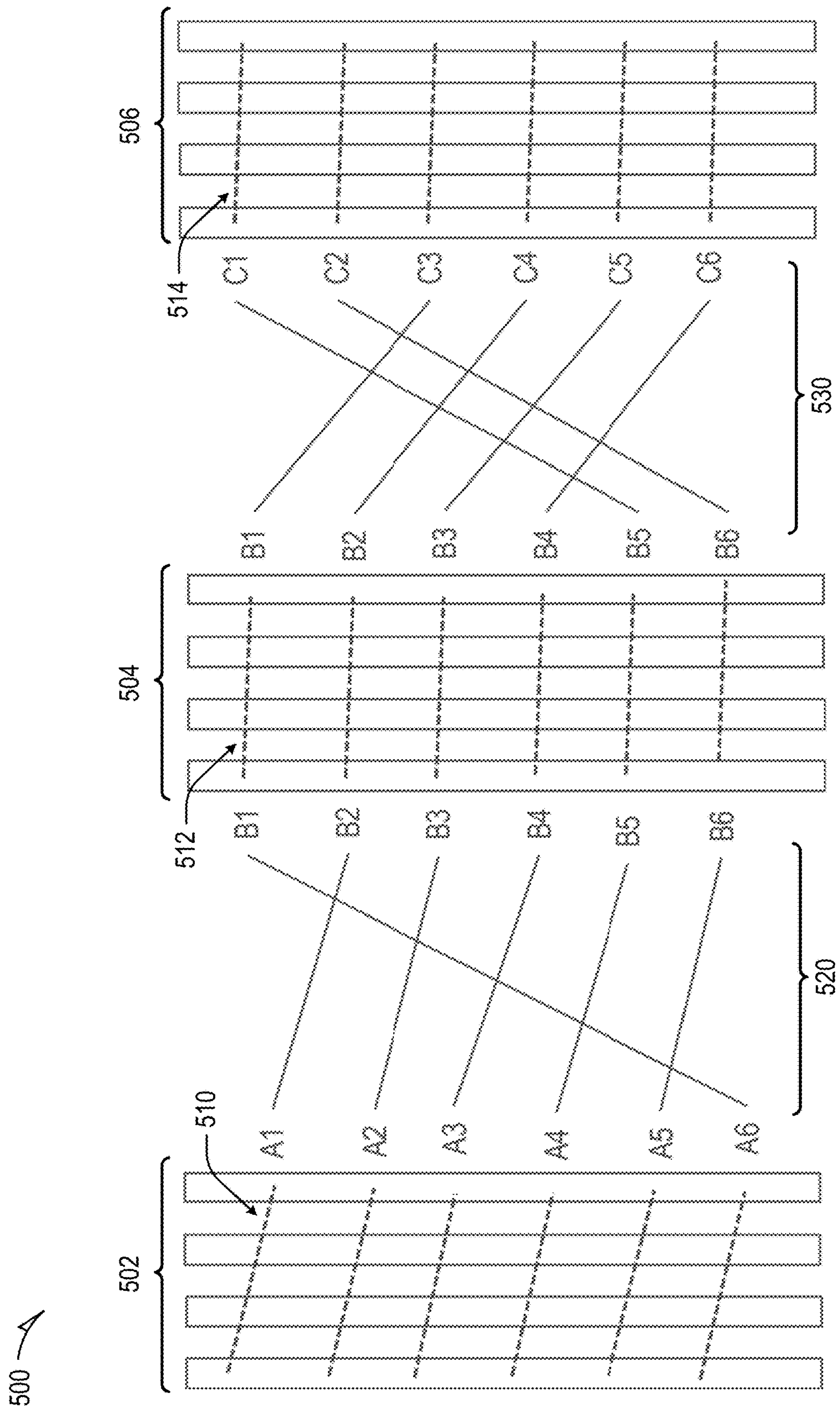

FIGS. 3 through 5 are block diagrams illustrating example superblock structures 300, 400, 500 formed based on piecewise slopes, in accordance with some embodiments of the present disclosure. In particular, superblock structures 300, 400 illustrate examples of superblock structures formed using two pluralities (e.g., groups) of planes of a set of memory circuit die, while superblock structure illustrates an example of superblock structure formed using more than two pluralities (e.g., groups) of planes of a set of memory circuit die.

Referring now to FIG. 3, superblock structure 300 comprises pieces (e.g., sub-stripes) A1, A2, A3, A4, A5, A6 on a first plurality (e.g., group) of planes 302, and pieces (e.g., sub-stripes) B1, B2, B3, B4, B5, B6 on a second plurality (e.g., group) of planes 304. Depending on the embodiment, each of the pluralities of planes 302, 304 can all be on a single memory circuit die of a memory device, or can span multiple memory circuit die of the memory device. Each of the pieces A1, A2, A3, A4, A5, A6 for the first plurality of planes 302 are determined based on a first linear slope 310, and each of the pieces B1, B2, B3, B4, B5, B6 for the second plurality of planes 304 are determined based on a second linear slope 312. Connections (e.g., joints) 320 connect (e.g., join) each of pieces A1, A2, A3, A4, A5, A6 to individual pieces B1, B2, B3, B4, B5, B6. For example, as shown, piece A1 connects (e.g., joins) with piece B2 to form a full stripe of a first superblock, piece A2 connects with piece B3 to form a full stripe of a second superblock, piece A3 connects with piece B4 to form a full stripe of a third superblock, piece A4 connects with piece B5 to form a full stripe of a fourth superblock, piece A5 connects with piece B6 to form a full stripe of a fifth superblock, and piece A6 connects with piece B1 to form a full stripe of a sixth superblock. As described herein, connections 320 can be determined by using an algorithm that searches (e.g., evaluates) multiple connection permutations for joining the pieces to form full stripes of individual superblocks.

Referring now to FIG. 4, superblock structure 400 represents a variation of superblock structure 300 of FIG. 3 with different connections. In particular, connections 420 of superblock structure 400 can represent a mapping (e.g., 1-to-1 mapping) of pieces (e.g., sub-stripes) that is better than the one used for superblock structure 300 (e.g., where the determination is made by a search algorithm). Connections 420 connect each of pieces A1, A2, A3, A4, A5, A6 to individual pieces B1, B2, B3, B4, B5, B6. As shown, piece A1 connects with piece B3 to form a full stripe of a first superblock, piece A2 connects with piece B2 to form a full stripe of a second superblock, piece A3 connects with piece B1 to form a full stripe of a third superblock, piece A4 connects with piece B5 to form a full stripe of a fourth superblock, piece A5 connects with piece B6 to form a full stripe of a fifth superblock, and piece A6 connects with piece B4 to form a full stripe of a sixth superblock.

Referring now to FIG. 5, superblock structure 500 represents superblocks formed using three pluralities (e.g., groups) of planes. Superblock structure 500 comprises pieces (e.g., sub-stripes) A1, A2, A3, A4, A5, A6 on a first plurality of planes 502 (hereafter, plane group A), pieces (e.g., sub-stripes) B1, B2, B3, B4, B5, B6 on a second plurality (e.g., group) of planes 504 (hereafter, plane group B), and pieces (e.g., sub-stripes) C1, C2, C3, C4, C5, C6 on a third plurality (e.g., group) of planes 506 (hereafter, plane group C). Depending on the embodiment, each of the pluralities of planes 502, 504, 506 can all be on a single memory circuit die of a memory device, or can span multiple memory circuit die of the memory device. Each of the pieces A1, A2, A3, A4, A5, A6 for the first plurality of planes 502 are determined based on a first linear slope 510, each of the pieces B1, B2, B3, B4, B5, B6 for the second plurality of planes 504 are determined based on a second linear slope 512, and each of the pieces C1, C2, C3, C4, C5, C6 for the third plurality of planes 506 are determined based on a second linear slope 514. Connections 520 connect each of pieces A1, A2, A3, A4, A5, A6 of the first plurality of planes 502 to individual pieces B1, B2, B3, B4, B5, B6 of the second plurality of planes 504, and connections 530 connect each of pieces B1, B2, B3, B4, B5, B6 of the second plurality of planes 504 to individual pieces C1, C2, C3, C4, C5, C6 of the third plurality of planes 506. Based on connections 520 and 530, a first superblock is formed by pieces A1, B2, C4, a second superblock is formed by pieces A2, B3, C5, a third superblock is formed by pieces A3, B4, C6, a fourth superblock is formed by pieces A4, B5, C1, a fifth superblock is formed by pieces A5, B6, C2, and a sixth superblock is formed by pieces A6, B1, C3.

Superblock structure 500 as shown forms individual superblocks by a group A-group B-group C connection structure, where pieces A1 through A6 of the plane group A connect to pieces of B1 through B6 plane group B, and pieces B1 through B6 of plane group B connect to pieces C1 through C6 of plane group C. Alternatively, some embodiments can determine (e.g., by an algorithm that performs plane group connection randomization) that an alternative superblock structure would be better (e.g., superblock structure having connections minimize standard deviation). For example, an alternative superblock structure could be formed using a group B-group C-group A connection structure, a group B-group A-group C connection structure, or a group C-group B-group A connection structure. For instance, an algorithm (e.g., search algorithm) can be used to: first optimize slope for each of group A, group B, and group C (e.g., performed sequentially); then optimize permutation of Ax-By-Cz connections (e.g., that minimize standard deviation) for all randomizations of connecting together group A, group B and group C (there are 3! possibilities); and select the permutation (from all randomizations identified) that results in the best superblock structure (e.g., based on one or more characteristics).

Figure 6:
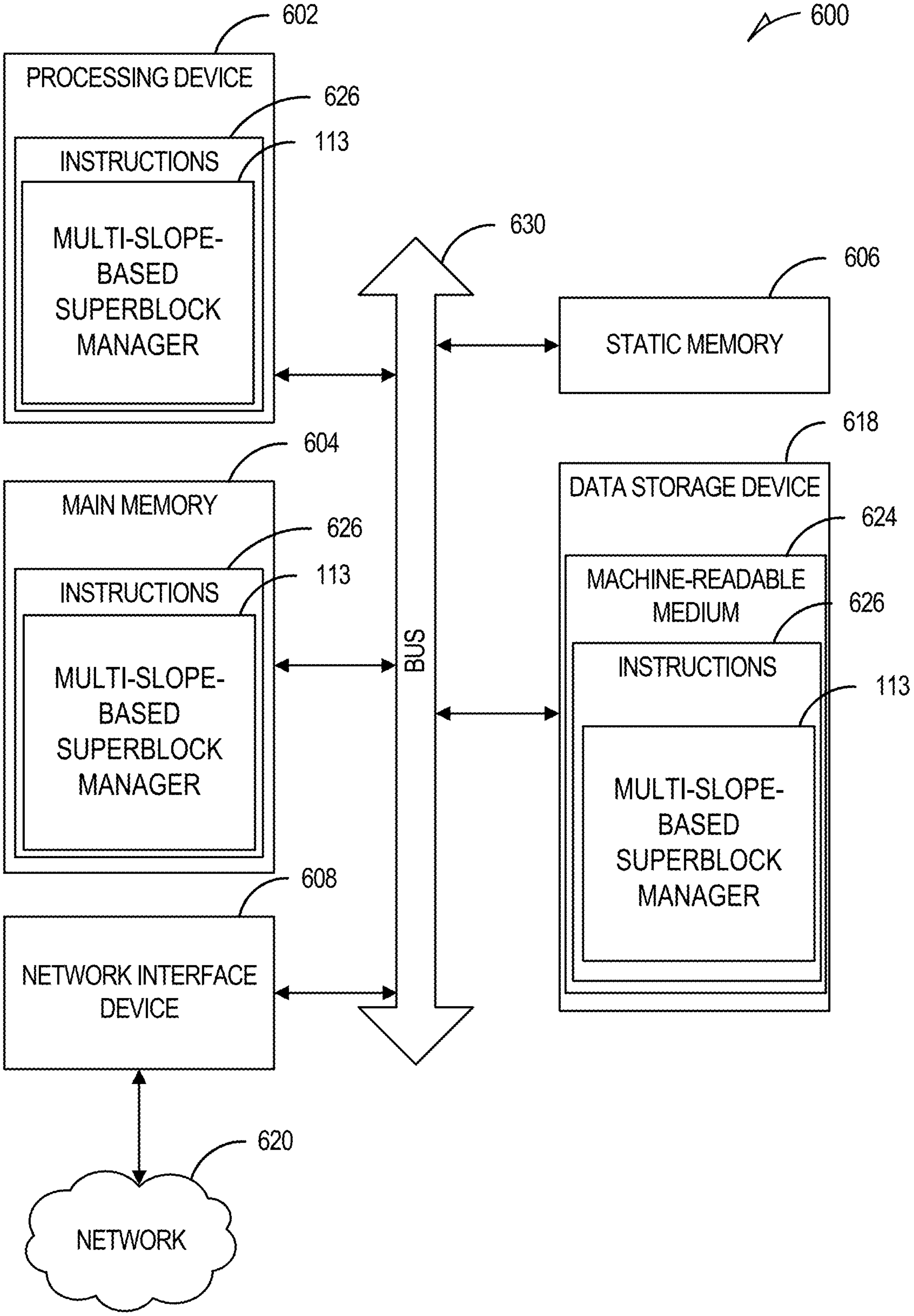
FIG. 6 is a block diagram of an example computer system in which embodiments of the present disclosure may operate.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or Rambus DRAM (RDRAM), etc.), a static memory 606 (e.g., flash memory, static random access memory (SRAM), etc.), and a data storage device 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application-specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage device 618 can include a machine-readable storage medium 624 (also known as a computer-readable medium) on which is stored one or more sets of instructions 626 or software embodying any one or more of the methodologies or functions described herein. For some embodiments, the machine-readable storage medium 624 is a non-transitory machine-readable storage medium. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage device 618, and/or main memory 604 can correspond to the memory sub-system 110 of FIG. 1.

In one embodiment, the instructions 626 include instructions to implement functionality that supports a superblock comprising blocks of a memory device that are determined based on piecewise slopes as described herein (e.g., the multi-slope-based superblock manager of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory device comprising a set of memory circuit die, each memory circuit die comprising multiple planes, each plane comprising multiple blocks; and a processing device, operatively coupled to the memory device, configured to perform operations comprising managing at least one superblock of a plurality of superblocks on the memory device, each individual superblock of the plurality of superblocks comprising: a first plurality of blocks comprising a single block from each plane of a first plurality of planes of at least one memory circuit die of the set of memory circuit die, each block of the first plurality of blocks having a first intra-plane position that is determined based on a first linear slope that spans across the first plurality of planes; and a second plurality of blocks comprising a single block from each plane of a second plurality of planes of the at least one memory circuit die, each block of the second plurality of blocks having a second intra-plane position that is determined based on a second linear slope that spans across the second plurality of planes, the second linear slope being different from the first linear slope.

In Example 2, the subject matter of Example 1 includes, wherein the first linear slope is a non-horizontal linear slope.

In Example 3, the subject matter of Example 2 includes, wherein the second linear slope is a horizontal linear slope.

In Example 4, the subject matter of Examples 1-3 includes, wherein both the first linear slope and the second linear slope are non-horizontal linear slopes.

In Example 5, the subject matter of Examples 1-4 includes, wherein the operations comprise: establishing the plurality of superblocks on the memory device, the establishing comprising defining, for the individual superblock, an individual connection between the first plurality of blocks and the second plurality of blocks.

In Example 6, the subject matter of Example 5 includes, wherein the operations comprise: receiving a set of commands from a host system, the plurality of superblocks being established in response to at least one command of the set of commands.

In Example 7, the subject matter of Examples 5-6 includes, wherein the operations comprise: receiving a set of commands from a host system, at least one command of the set of commands specifies the first linear slope and the second linear slope, the first linear slope and the second linear slope being determined by the host system.

In Example 8, the subject matter of Example 7 includes, wherein the host system determines the first linear slope and the second linear slope by analyzing a set of characteristics of the at least one memory circuit die.

In Example 9, the subject matter of Examples 1-8 includes, wherein the first linear slope and the second linear slope are determined based on a set of characteristics of the at least one memory circuit die.

In Example 10, the subject matter of Example 9 includes, wherein the set of characteristics comprises a characteristic describing a distribution of bad blocks for a select linear slope.

In Example 11, the subject matter of Examples 9-10 includes, wherein the set of characteristics comprises a characteristic describing a distribution of bad blocks for the at least one memory circuit die.

In Example 12, the subject matter of Examples 1-11 includes, wherein the managing of the at least one superblock comprises writing data to the at least one superblock.

In Example 13, the subject matter of Examples 1-12 includes, wherein the managing of the at least one superblock comprises reading data from the at least one superblock.

In Example 14, the subject matter of Examples 1-13 includes, wherein the individual superblock comprises: a third plurality of blocks comprising a single block from each plane of a third plurality of planes of the at least one memory circuit die, each block of the third plurality of blocks having a third intra-plane position that is determined based on a third linear slope, the third linear slope spanning across the third plurality of planes, the third linear slope being different from the second linear slope, a first connection for the individual superblock being defined between the first plurality of blocks and the second plurality of blocks, a second connection for the individual superblock being defined between the second plurality of blocks and the third plurality of blocks.

In Example 15, the subject matter of Example 14 includes, wherein the operations comprise: establishing the plurality of superblocks on the memory device, the establishing comprising defining, for the individual superblock, the first connection and the second connection.

In Example 16, the subject matter of Examples 1-15 includes, wherein the at least one memory circuit die is a first memory circuit die, and wherein the individual superblock comprises: a third plurality of blocks comprising a single block from each plane of a third plurality of planes of a second memory circuit die of the set of memory circuit die, each block of the third plurality of blocks having a third intra-plane position that is determined based on a third linear slope, the third linear slope spanning across the third plurality of planes, the third linear slope being different from the second linear slope, a first connection for the individual superblock being defined between the first plurality of blocks and the second plurality of blocks, a second connection for the individual superblock being defined between the second plurality of blocks and the third plurality of blocks.

In Example 17, the subject matter of Example 16 includes, wherein the operations comprise: establishing the plurality of superblocks on the memory device, the establishing comprising defining, for the individual superblock, the first connection and the second connection.

Example 18 is at least one machine-readable medium including instructions that, when executed by a processing device of a memory sub-system, cause the processing device to perform operations to implement of any of Examples 1-17.

Example 19 is a method to implement of any of Examples 1-17.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (e.g., non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device comprising a set of memory circuit die, each memory circuit die comprising multiple planes, each plane comprising multiple blocks; and a processing device, operatively coupled to the memory device, configured to perform operations comprising managing at least one superblock of a plurality of superblocks on the memory device, each individual superblock of the plurality of superblocks comprising:

a first plurality of blocks comprising a single block from each plane of a first plurality of planes of at least one memory circuit die of the set of memory circuit die, each block of the first plurality of blocks having a first intra-plane position that is determined based on a first linear slope that spans across the first plurality of planes; and a second plurality of blocks comprising a single block from each plane of a second plurality of planes of the at least one memory circuit die, each block of the second plurality of blocks having a second intra-plane position that is determined based on a second linear slope that spans across the second plurality of planes, the second linear slope being different from the first linear slope.

2. The system of claim 1, wherein the first linear slope is a non-horizontal linear slope.

3. The system of claim 2, wherein the second linear slope is a horizontal linear slope.

4. The system of claim 1, wherein both the first linear slope and the second linear slope are non-horizontal linear slopes.

5. The system of claim 1, wherein the operations comprise:

establishing the plurality of superblocks on the memory device, the establishing comprising defining, for the individual superblock, an individual connection between the first plurality of blocks and the second plurality of blocks.

6. The system of claim 5, wherein the operations comprise:

receiving a set of commands from a host system, the plurality of superblocks being established in response to at least one command of the set of commands.

7. The system of claim 5, wherein the operations comprise:

receiving a set of commands from a host system, at least one command of the set of commands specifies the first linear slope and the second linear slope, the first linear slope and the second linear slope being determined by the host system.

8. The system of claim 7, wherein the host system determines the first linear slope and the second linear slope by analyzing a set of characteristics of the at least one memory circuit die.

9. The system of claim 1, wherein the first linear slope and the second linear slope are determined based on a set of characteristics of the at least one memory circuit die.

10. The system of claim 9, wherein the set of characteristics comprises a characteristic describing a distribution of bad blocks for a select linear slope.

11. The system of claim 9, wherein the set of characteristics comprises a characteristic describing a distribution of bad blocks for the at least one memory circuit die.

12. The system of claim 1, wherein the managing of the at least one superblock comprises writing data to the at least one superblock.

13. The system of claim 1, wherein the managing of the at least one superblock comprises reading data from the at least one superblock.

14. The system of claim 1, wherein the individual superblock comprises:

a third plurality of blocks comprising a single block from each plane of a third plurality of planes of the at least one memory circuit die, each block of the third plurality of blocks having a third intra-plane position that is determined based on a third linear slope, the third linear slope spanning across the third plurality of planes, the third linear slope being different from the second linear slope, a first connection for the individual superblock being defined between the first plurality of blocks and the second plurality of blocks, a second connection for the individual superblock being defined between the second plurality of blocks and the third plurality of blocks.

15. The system of claim 14, wherein the operations comprise:

establishing the plurality of superblocks on the memory device, the establishing comprising defining, for the individual superblock, the first connection and the second connection.

16. The system of claim 1, wherein the at least one memory circuit die is a first memory circuit die, and wherein the individual superblock comprises:

a third plurality of blocks comprising a single block from each plane of a third plurality of planes of a second memory circuit die of the set of memory circuit die, each block of the third plurality of blocks having a third intra-plane position that is determined based on a third linear slope, the third linear slope spanning across the third plurality of planes, the third linear slope being different from the second linear slope, a first connection for the individual superblock being defined between the first plurality of blocks and the second plurality of blocks, a second connection for the individual superblock being defined between the second plurality of blocks and the third plurality of blocks.

17. The system of claim 16, wherein the operations comprise:

establishing the plurality of superblocks on the memory device, the establishing comprising defining, for the individual superblock, the first connection and the second connection.

18. At least one non-transitory machine-readable storage medium comprising instructions that, when executed by a processing device of a memory sub-system, cause the processing device to perform operations comprising:

establishing a plurality of superblocks on a memory device of the memory sub-system, the memory device comprising a plurality of memory circuit die, each memory circuit die comprising multiple planes, each plane comprising multiple blocks, each individual superblock of the plurality of superblocks comprising:

a first plurality of blocks comprising a single block from each plane of a first plurality of planes of a first memory circuit die of the plurality of memory circuit die, each block of the first plurality of blocks having a first intra-plane position that is determined based on a first linear slope that spans across the first plurality of planes; and a second plurality of blocks comprising a single block from each plane of a second plurality of planes of a second memory circuit die of the plurality of memory circuit die, each block of the second plurality of blocks having a second intra-plane position that is determined based on a second linear slope that spans across the second plurality of planes, the second linear slope being different from the first linear slope; and managing at least one superblock of the plurality of superblocks on the memory device.

19. A method comprising:

determining, by a processing device of a host system, a set of characteristics of a memory device of a memory sub-system, the memory device comprising a set of memory circuit die, each memory circuit die comprising multiple planes, each plane comprising multiple blocks;

determining, by the processing device, formation of a plurality of superblocks on the memory device, the determining of the formation comprising:

determining a plurality of different linear slopes for the plurality of superblocks, each different linear slope of the plurality of linear slopes being associated with a different plurality of planes of the set of memory circuit die; and determining a set of connections between the different plurality of planes; and causing, by the processing device, the plurality of superblocks to be established on the memory device such that each individual superblock of the plurality of superblocks comprises:

a first plurality of blocks comprising a single block from each plane of a first plurality of planes of a first memory circuit die of the plurality of memory circuit die, each block of the first plurality of blocks having a first intra-plane position that is determined based on a first linear slope of the plurality of linear slopes, the first linear slope spanning across the first plurality of planes; and a second plurality of blocks comprising a single block from each plane of a second plurality of planes of a second memory circuit die of the plurality of memory circuit die, each block of the second plurality of blocks having a second intra-plane position that is determined based on a second linear slope of the plurality of linear slopes, the second linear slope spanning across the second plurality of planes, the second linear slope being different from the first linear slope.

20. The method of claim 19, wherein the first linear slope is a non-horizontal linear slope, wherein the first linear slope determined for the first plurality of blocks is optimized for the first plurality of blocks, and wherein the second linear slope determined for the second plurality of blocks is optimized for the second plurality of blocks.

* * * * *